United States Patent [19]
Kurosawa

[11] Patent Number: 6,134,369
[45] Date of Patent: Oct. 17, 2000

[54] COMPACT OPTICAL WAVEGUIDE

[75] Inventor: Toshiharu Kurosawa, Osaka, Japan

[73] Assignees: Matsushita Electric Industrial Co., Osaka, Japan; Panasonic Technologies, Inc., Princeton, N.J.

[21] Appl. No.: 09/282,723

[22] Filed: Mar. 31, 1999

[51] Int. Cl.$^7$ .................................................. G02B 26/00
[52] U.S. Cl. ........................... 385/132; 385/30; 385/129
[58] Field of Search .............................. 385/27, 30, 129, 385/132

[56] References Cited

U.S. PATENT DOCUMENTS

| | | |
|---|---|---|
| 5,600,483 | 2/1997 | Fan et al. . |
| 5,682,401 | 10/1997 | Joannopoulos et al. . |
| 6,052,213 | 4/2000 | Burt et al. . |

OTHER PUBLICATIONS

Xinbing Liu et al., Ultrashort Laser Pulses Tackle Precision Machining, Laser Focus World, PennWell Publishing Company (Aug. 1997).

John D. Joannopoulos et al., Photonic Crystals Molding the Flow of Light (Chapter 5, pp. 54–77, Princeton University Press (1995).

*Primary Examiner*—Robert H. Kim
*Attorney, Agent, or Firm*—Ratner & Prestia

[57] ABSTRACT

A compact optical waveguide employs a photonic band gap element as a reflector to enable a light beam to be reflected at angles greater than the critical angle. The photonic band gap device is a two-dimensional array of columnar holes formed in the substrate the holes are filled with air or another material having a different dielectric constant than the substrate. The optical waveguide forms a right angle bend and first and second photonic band gap devices are formed on both the inside and outside angles of the bend to deflect light which is incident on the waveguide at an angle greater than a critical angle defined by the materials that constitute the optical waveguide. The columnar holes of the photonic band gap element have a diameter of approximately one-half wavelength and are arranged in a triangular packing having an inter-column separation of approximately one-half wavelength of the light which is to be transmitted through the waveguide. The optical waveguide is formed by depositing a transmissive material having a first refractive index on top of a substrate which has a second refractive index and, using an ultrafast laser, cutting channels into the transmissive material to define straight portions of the waveguide and, also using the ultrafast laser, cutting the columns into the transmissive material to define the photonic band gap elements. In another example of the invention, the optical waveguide is formed by depositing a transmissive material having a first refractive index into a channel in a substrate which has a second refractive index and, using an ultrafast laser to cut the columns into the transmissive material to form the photonic band gap elements. In a final example of the invention, the optical waveguide is formed by depositing a transmissive material having a first refractive index which forms a channel on top of a substrate which has a second refractive index and, using an ultrafast laser to cut the columns into the transmissive material to form the photonic band gap elements.

4 Claims, 3 Drawing Sheets

COMPACT OPTICAL WAVEGUIDE

FIELD OF THE INVENTION

The present invention concerns optical wave guides and, in particular, a compact optical wave guide which employs a photonic band gap element to convey light around angles that are greater than the critical angle for the waveguide.

BACKGROUND OF THE INVENTION

Optical waveguides are commonly used to transmit light from one location to another. One form of optical waveguide is an optical fiber. Optical fibers typically include a core element which has a first refractive index, $n_1$, and a cladding which has a second refractive index, $n_2$. The optical fiber transmits light with minimal loss via total internal reflection.

Total internal reflection occurs when the light is incident at the barrier between the core and the cladding with an angle less than a critical angle defined by the difference in refractive index between the core element and the cladding element. The critical angle θ is defined by equation (1).

$$\theta = \cos^{-1}(n_2/n_1) \quad (1)$$

FIG. 1 is a top-plan view of an exemplary optical waveguide formed in an integrated circuit 100 substrate. The integrated circuit substrate 100 has an refractive index $n_2$ and a light transmitting channel 110 through the substrate has a refractive index $n_1$. The air surrounding the substrate has a refractive index $n_3$. To optimally transmit light, the optical waveguide is shaped so that light being transmitted through the channel 110 can not be incident on the edge of the channel 110 at an angle greater than the critical angle. If this were to occur, the light would not be totally internally reflected and, at least some of the light would pass through the wall of the channel 110 and be dissipated in the substrate 100.

To ensure that substantially all of the light which is applied to the input port 120 of the waveguide channel 110 is transmitted through the waveguide and exits the waveguide at the output port 130, the waveguide channel 110 is designed with only gradual bends. Thus, a light ray 112 which comes into the waveguide horizontally, as shown in FIG. 1, is changed to a corresponding vertical ray 118 through a series of reflections 114 and 116. The angle φ at which the light ray is incident to the barrier between the channel 112 and the substrate 110 must be less than the critical angle θ. Thus, several reflections are needed to produce a total change in the angle of the light ray of 90°.

If an optical waveguide routes a light signal on an integrated circuit in any path other than a straight line, the waveguide according to the prior art will need a gradual bend for each change in direction. These gradual bends consume valuable area on the surface of the integrated circuit, area which may otherwise be occupied by signal processing circuitry or other photonic components.

SUMMARY OF THE INVENTION

The present invention is embodied in an optical waveguide which employs a photonic band gap element as a reflector to enable a light beam to be reflected at angles greater than the critical angle. The photonic band gap device is formed from a two-dimensional array of columns formed in the substrate. The columns have a dielectric constant which differs from that of the substrate.

According to one aspect of the invention, first and second photonic band gap devices are formed on both sides of a sharp bend in the optical waveguide.

According to another aspect of the invention, the columns which constitute the band gap device are columnar holes, formed in the substrate by laser machining using an ultrafast laser and the columns are filled with air or the columns are filled with higher refractive index materials than the substrate.

According to yet another aspect of the invention, the columns of the photonic band gap elements are arranged in a triangular packing such that the band gap devices operate for light regardless of its polarization.

According to another aspect of the invention, the optical waveguide is formed by depositing a transmissive material having a first refractive index on top of a substrate which has a second refractive index and, using an ultrafast laser, cutting channels into the transmissive material to define straight portions of the waveguide and cutting the columns into the transmissive material to define the photonic band gap elements.

According to yet another aspect of the invention, the optical waveguide is formed by depositing a transmissive material having a first refractive index into a channel in a substrate which has a second refractive index and, using an ultrafast laser, cutting the columns into the transmissive material to form the photonic band gap elements.

According to another aspect of the invention, the optical waveguide is formed by depositing a transmissive material having a first refractive index on top of a substrate which has a second refractive index and, using an ultrafast laser, cutting the columns into the transmissive material to form the photonic band gap elements.

DETAILED DESCRIPTION OF THE EXEMPLARY EMBODIMENT

Figure 1:
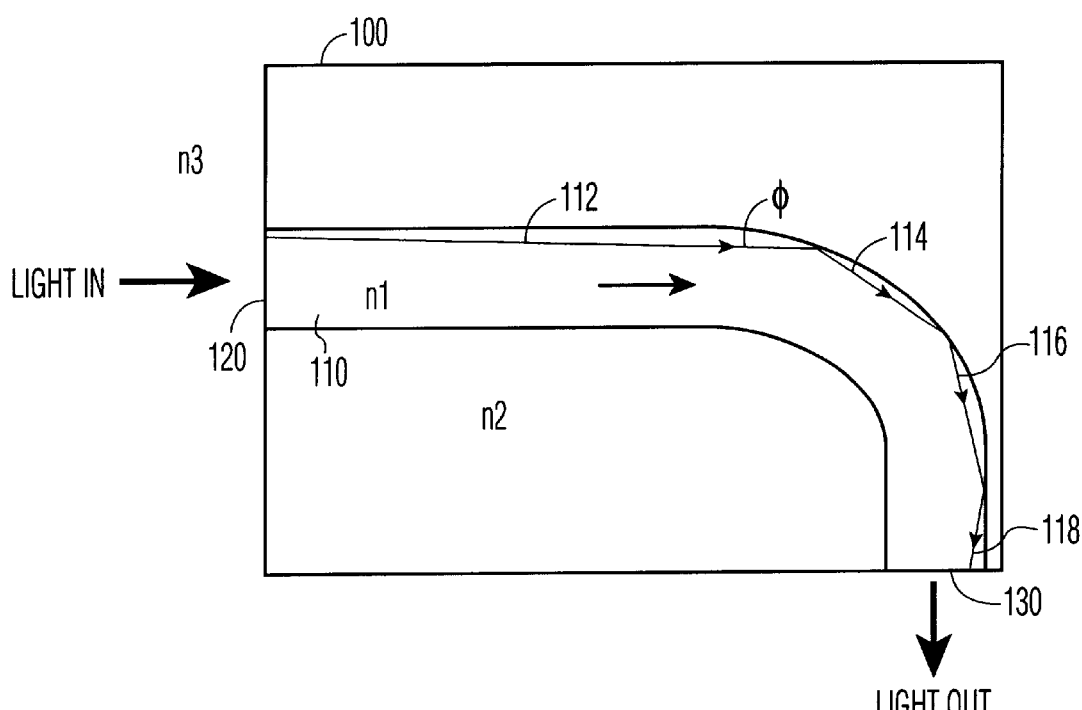
FIG. 1 (prior art) is a top plan view of a conventional optical waveguide.
Figure 2:
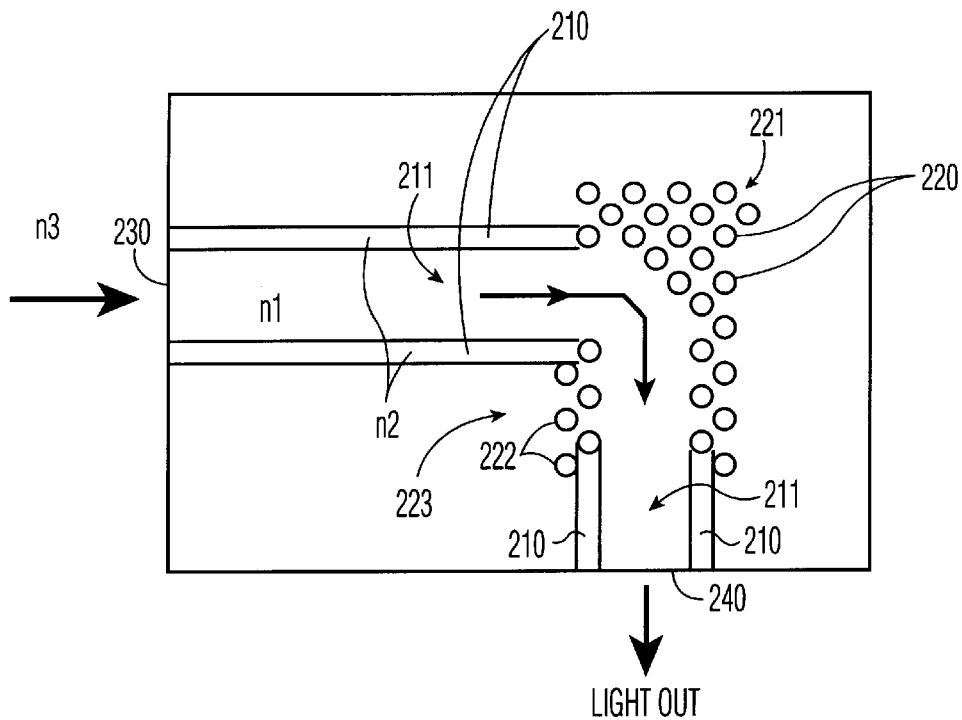
FIG. 2 is a top-plan view of an optical waveguide according to the present invention.

FIGS. 1 and 2 illustrate a first embodiment of the invention. In this embodiment, the waveguide is formed in a transmissive layer 200 which is deposited on top of a substrate 202. The transmissive layer 200 has an refractive index $n_1$ while the substrate has a refractive index $n_2$ and the atmosphere surrounding the substrate 202 and has a refractive index of $n_3$.

Four slots 210 are machined into the transmissive layer using an ultrafast laser, for example a picosecond or femtosecond laser. These slots define the straight-line portions of the waveguide because the refractive index of the atmosphere differs from that of the transmissive layer 200. In addition, because the slots 210 are machined using an ultrafast laser, they may be smooth and straight and may have side walls that are substantially perpendicular to the plane of the transmissive layer 200.

In the exemplary embodiment of the invention, the ultrafast laser may be a titanium doped sapphire laser (Ti:sapphire) having a wavelength of 800 nm, a pulse width of 150 fs, and a pulse energy of 1 mJ (peak power of $10^{-6}j/(150\times10^{-15})=6.7MW$), for example.

Next the ultrafast laser is used to form a pattern of holes 220 in the substrate to form the two-dimensional photonic band gap element 221 on the outside of the bend in the waveguide. Finally, the ultrafast laser is used to form holes 222 in the substrate to form the two-dimensional photonic band gap element 223 on the inside of the bend in the waveguide.

The straight portions of the waveguide channel 211 are surrounded by materials having refractive indices which differ from that of the channel 211. Below the channel is the substrate 202 which has a refractive index of $n_2$. Above and on either side of the channel 211 is the atmosphere which has an index of refraction of $n_3$. Thus, along the straight portions of the channel, the waveguide operates in the same manner as that shown in FIG. 1.

Figure 3:
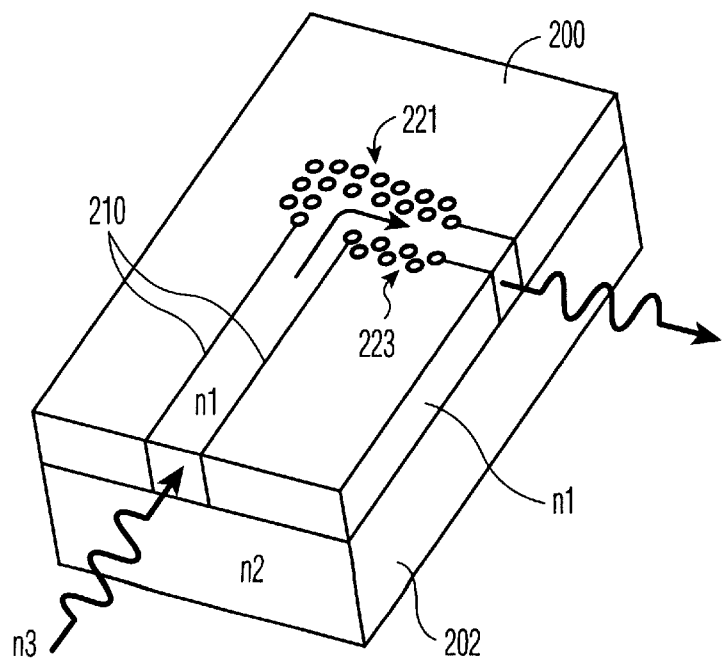
FIG. 3 is a perspective drawing of the optical waveguide shown in FIG. 2.

The waveguide shown in FIGS. 2 and 3, however, has a sharp bend defined by the band gap elements 221 and 223. If, instead of the band gap elements 221 and 223, the corners of the waveguide were formed with slots similar to the slots 210, light incident on the slots at the corner sections would not be totally internally reflected because it would arrive at angles greater than the critical angle for the channel. Instead of being totally internally reflected, this light would be at least partially dissipated in the region of the transmissive layer 200 outside of the wave guide channel 211.

The two-dimensional band gap elements 221 and 223 form reflective surfaces at the corners of the transmissive channel 211. Photonic band gap elements are described in a textbook by J. D. Joannopoulos et al. Entitled *Photonic Crystals,* Princeton University Press, 1995, which is incorporated by reference herein for its teaching on photonic band gap elements. Briefly, two-dimensional photonic band gap elements are formed by placing columns of a material having a first dielectric constant, $\epsilon_1$, into a material having a second dielectric constant, $\epsilon_2$. The columns are formed with a size and spacing on the order of one-half of the wavelength of the light which is to be deflected. This pattern of columns forms a forbidden band of photon energy levels which is similar to the quantum mechanical band gap for electrons that exists in certain crystals. Thus, light in a range of wavelengths that correspond to the forbidden photon levels cannot propagate through the band gap element and, thus, is reflected by the element.

The pattern in which the columns are formed also determines certain properties of the band gap element. For example, the triangular pattern shown in FIG. 2 forms a band gap which reflects light at the selected frequency in both the Tm mode and the Te mode (i.e. regardless of its polarization). The difference in the dielectric constant of the materials that form the band gap element affects the performance of the element. Accordingly, it is desirable to use a transmissive material which has relatively large differences in both refractive index and dielectric constant compared to the substrate material and to air. The inventors have determined that silicon (Si) and silicon dioxide ($SiO_2$) perform well as the substrate and transmissive materials respectively. Although the invention shows a triangular packing of cylindrical columns to form the band gap elements, it is contemplated that other packing mechanisms (e.g. square or honeycomb) may be used as well as other column shapes. In addition, the exemplary embodiment shows columns of holes formed in the transmissive layer 200 which are then filled with an atmosphere that has a dielectric constant that is less than that of the transmissive layer. Instead, it is contemplated that these holes may be filled with a substance having a dielectric constant greater than that of the transmissive layer 200.

It is advantageous to use ultrafast lasers to form the slots 210 and the holes 220 because these lasers can machine slots and holes having very small dimensions. In addition, the damage done by a ultrafast laser pulse tends to be localized; the heat from the pulse does not dissipate into the surrounding material. In addition, by controlling the intensity of the pulse, the ultrafast laser may be tuned to have a relatively high ablative threshold for the material that is being worked. When this is done, only the portion of the pulse near the center of the beam has sufficient energy to damage the workpiece. Thus, the holes and slots made by the ultrafast laser may be smaller in dimension than the wavelength of the laser light. These properties of the ultrafast laser are useful where, as described above, holes having a size and a spacing of about one-half of the wavelength of the transmitted light are formed in the transmissive material 200. The tendency of ultrafast pulses to not dissipate heat into the surrounding material is also advantageous for forming photonic band gap elements as any heat that dissipates into the surrounding material may change the refractive index of the material, changing the properties of the band gap element when light is incident on columns of the band gap element at an angle less than the critical angle. Because relatively little heat is dissipated by the ultrafast laser, however, there is essentially no change in the refractive index of the surrounding material.

Figure 4:
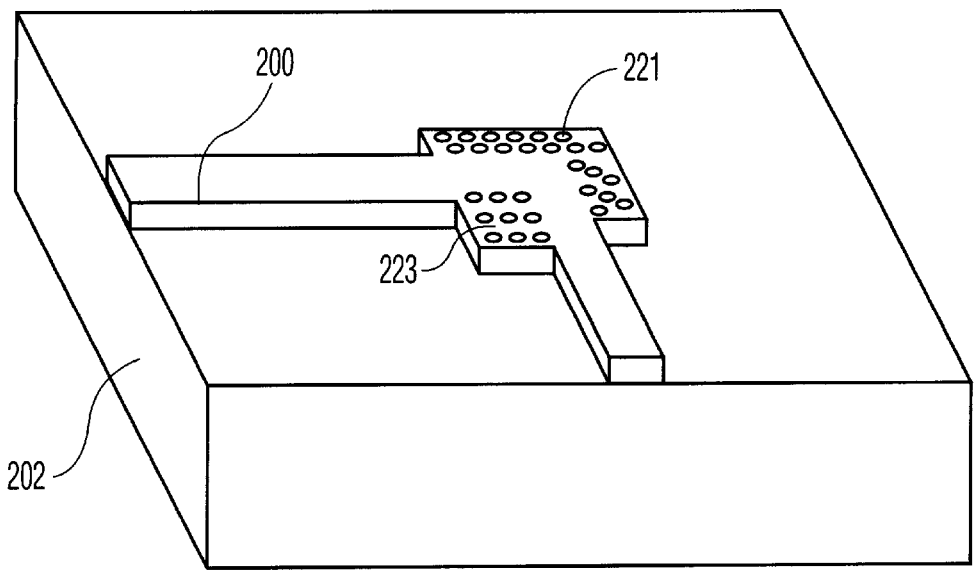
FIG. 4 is a perspective drawing of an optical waveguide according to another embodiment of the invention.

FIG. 4 shows another exemplary embodiment of the invention. In this embodiment, instead of using the ultrafast laser to form slots on the sides of the waveguide, the transmissive layer 200 is chemically etched away outside of the waveguide channel such that the sides of the channel, interfacing with the atmosphere, have a difference in refractive index which supports total internal reflection. It is desirable for the unused portions of the transmissive layer to be removed using an anisotropic etchant such that the waveguide channel is formed with edges that are substantially perpendicular to the substrate 202.

The transmissive layer is formed with areas, on the outside and inside corners of the bend in the waveguide, in which the band gap elements 221 and 223 may be implemented. The band gap elements 221 and 223 are formed in the same way as described above with reference to FIGS. 2 and 3. The ultrafast laser is used to form columns which extend through the transmissive layer 200 and which form, for example, a triangular lattice of columnar holes in the transmissive layer 200. The size and spacing of these holes is approximately one-half wavelength of the light that is to be transmitted through the waveguide.

Figure 5:
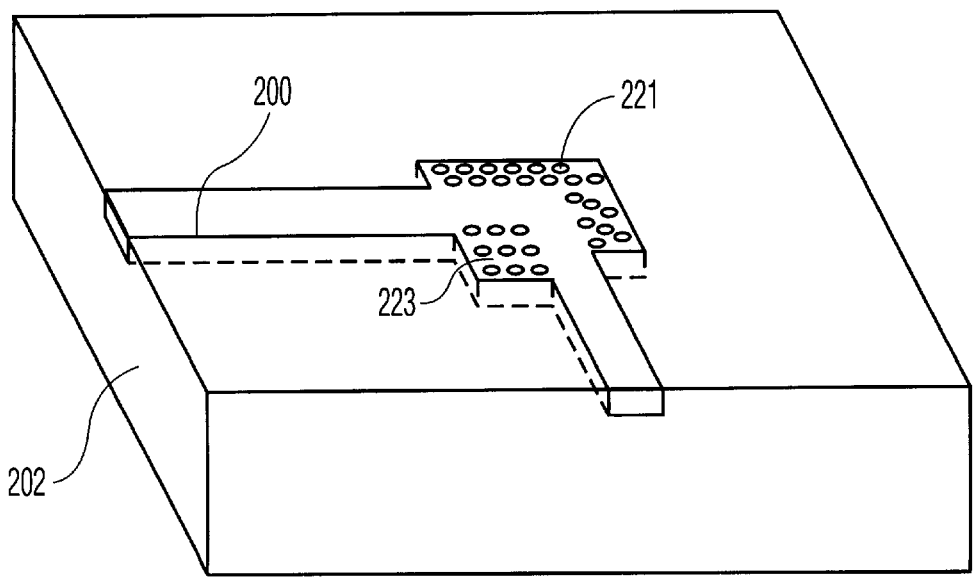
FIG. 5 is a perspective drawing of an optical waveguide according to yet another embodiment of the invention.

FIG. 5 shows a third embodiment of the subject invention. In this embodiment, the substrate 202 is chemically etched to form a channel and the transmissive material is deposited into the channel. As for the waveguide shown in FIG. 4, it is desirable for the channel in the substrate 202 to be etched with an anisotropic etchant to achieve relatively sharp edges. Edges of this type ensure that light propagating through the waveguide is totally internally reflected from the sides of the waveguide and is not reflected up and out of the upper face of the channel. As described above with reference to FIG. 4, the photonic band gap devices 221 and 223 are formed by using a ultrafast laser to make, for example, a triangular lattice of holes in the transmissive material 200.

While the invention has been described in terms of an exemplary embodiment, it may be practiced as described above with modifications within the scope of the appended claims.

What is claimed:

1. An optical waveguide comprising:

a channel having a first refractive index which is surrounded by one or more materials having refractive indexes that differ from the first refractive index, the channel having first and second portions which are arranged at an angle relative to each other which angle is greater than a critical angle defined by the refractive indexes of the channel and the surrounding materials;

a photonic band gap element positioned to couple the first and second portions of the channel, the photonic band gap element being configured to act as a reflector for light transmitted through the waveguide which is incident on the photonic band gap element at angles greater than the critical angle.

2. An optical waveguide according to claim 1, wherein the first and second portions of the channel join to form a bend having an inside angle and an outside angle and the photonic band gap element includes first and second photonic band gap elements positioned respectively at the outside angle and inside angle of the bend.

3. An optical waveguide according to claim 1, wherein the photonic band gap element comprises a plurality of columnar holes having a diameter approximately equal to one-half wavelength of the light transmitted through the waveguide, the columnar holes being formed adjacent to the channel and being filled with an atmosphere.

4. An optical waveguide according to claim 3, wherein the columnar holes of the photonic band gap elements are arranged in a triangular packing having an inter-column spacing of approximately one half wavelength of the light transmitted through the waveguide.

* * * * *